(12) United States Patent
Busch

(10) Patent No.: US 12,435,670 B2
(45) Date of Patent: Oct. 7, 2025

(54) AIR CONDUCTION SYSTEM

(71) Applicant: MTU Aero Engines AG, Munich (DE)

(72) Inventor: Nils Busch, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/792,356

(22) Filed: Aug. 1, 2024

(65) Prior Publication Data
US 2025/0052197 A1 Feb. 13, 2025

(30) Foreign Application Priority Data

Aug. 8, 2023 (DE) ...................... 10 2023 121 050.5

(51) Int. Cl.
*F02C 7/18* (2006.01)
(52) U.S. Cl.
CPC ..................................... *F02C 7/18* (2013.01)
(58) Field of Classification Search
CPC .................. F02C 7/18; F02C 9/18; F02C 6/08
See application file for complete search history.

(56) References Cited

U.S. PATENT DOCUMENTS

| | | | |
|---|---|---|---|
| 4,674,951 A * | 6/1987 | Jourdain | ................. F02K 7/075 |
| | | | 415/28 |
| 4,679,982 A | 7/1987 | Bouiller et al. | |
| 2005/0072158 A1 | 4/2005 | Christopherson | |
| 2023/0228219 A1* | 7/2023 | Zheng | ................. F04D 27/0215 |
| | | | 60/785 |

FOREIGN PATENT DOCUMENTS

| | | |
|---|---|---|
| DE | 102013215371 A1 | 2/2015 |
| DE | 102014217830 A1 | 3/2016 |
| EP | 2233703 B1 | 12/2019 |

\* cited by examiner

*Primary Examiner* — Katheryn A Malatek
(74) *Attorney, Agent, or Firm* — Hinckley, Allen & Snyder, LLP; David R. Josephs

(57) ABSTRACT

The invention relates to an air conduction system for an aircraft engine with a primary flow channel and a branch channel, in which, in particular, the branch channel can be a secondary flow channel and/or a bleed air channel, wherein the branch channel branches off the primary flow channel at a connecting region, comprising a closing device arranged at or in the connecting region for separating the branch channel from the primary flow channel, wherein the closing device has at least one closing ring for closing the connecting region.

11 Claims, 3 Drawing Sheets

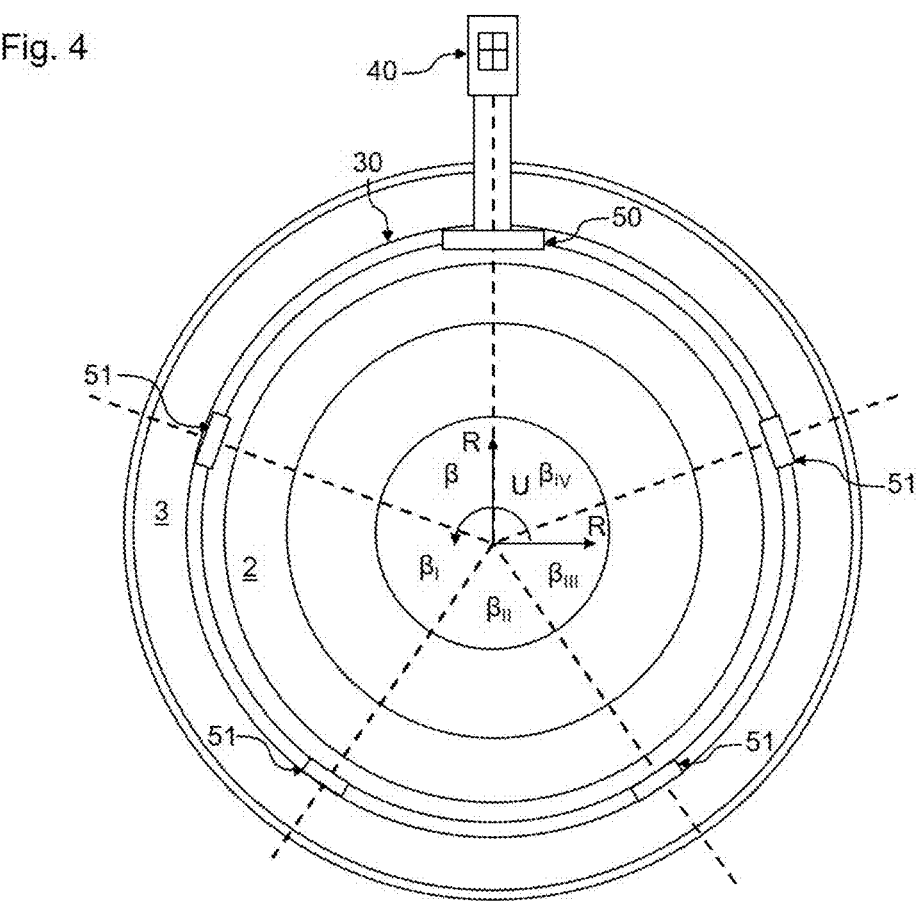

AIR CONDUCTION SYSTEM

BACKGROUND OF THE INVENTION

The invention relates to an air conduction system for an aircraft engine with a primary flow channel and a branch channel, in which, in particular, the branch channel can be a secondary flow channel and/or a bleed air channel, wherein the branch channel branches off the primary flow channel at a connecting region.

In aircraft engines, the air is compressed in a compressor, which is divided into a multiplicity of compressor stages, carried into a combustion chamber, mixed with kerosene, and ignited, and finally undergoes pressure release in a turbine in order to utilize the supplied energy in the compressor and the combustion chamber. In many cases, in the region of the compressor, air that has been compressed at least partly is extracted for other purposes. Thus, in some aircraft engines, particularly in so-called low-bypass engines designed for the supersonic range, there is provided a secondary flow channel, through which the only partly compressed air is extracted in order to generate a larger thrust. In many civil turbofan engines used for commercial purposes, the partly compressed air is used as bleed air for cabin applications and for cooling the engine components situated downstream, such as the combustion chamber and the turbine.

An air conduction system that can adjust the air flow to be extracted may be required in this case in order to conduct the flow into a secondary flow channel, for example, which is also referred to as a bypass channel. Known, for example, is an engine in accordance with EP2233703B1, in which a bleed air system with essentially radially extending bleed air channels is presented, the closing system of which comprises an annular closing ring that can be shifted in the axial direction as well as an actuator that is arranged in the axial direction next to the bleed air channels for actuation of the closing ring. A drawback thereof is that the size of this air conduction system is relatively large, since the actuator controls the annular closing ring by means of a drive rod extending in an axial direction and does so, namely, in a region that is spaced far apart from a connecting region between the bleed air channel and the primary flow channel. As a result of this, a loss-associated air pocket is created when the closing ring is closed. Furthermore, the closing ring is designed as a rigid solid body and, accordingly, is detrimentally relatively heavy.

SUMMARY OF THE INVENTION

Therefore, an object of the invention is to specify an air conduction system for an aircraft engine with a primary flow channel and a branch channel, which gives rise to less loss.

Proposed for achieving this object in accordance with the invention is an air conduction system for an aircraft engine with a primary flow channel and a branch channel, in which, in particular, the branch channel can be a secondary flow channel and/or a bleed air channel, wherein the branch channel branches off the primary flow channel at a connecting region. The air conduction system includes a closing device that is arranged at or in the connecting region for separating the branch channel from the primary flow channel, wherein the closing device has at least one closing ring for closing the connecting region.

Advantageously, owing to the arrangement of the closing ring in the connecting region between the branch channel and the primary flow channel, a flush surface in the primary channel is created in a closed state of the closing device, so that an air conduction system with very low flow losses is created.

The primary flow channel may also be referred to as a core flow channel. Provided in the primary flow channel in succession in the flow direction are at least one compressor, a combustion chamber, and at least one turbine, wherein the branch channel branches off in a region of the compressor, in particular a low-pressure compressor. The primary flow channel and the branch channel of the aircraft engine can be arranged separated from one another in the radial direction by an intermediate housing downstream of the connecting region. The closing ring can preferably be composed of a metal or a metal alloy, in particular titanium or a titanium alloy.

Further advantages and features ensue from the following description of some preferred exemplary embodiments as well as from the dependent claims.

In a first embodiment of the air conduction system, the closing ring is formed from at least two elements that are joined to one another and bent at least in the circumferential direction, in particular sheet-metal-like annular elements. The two elements enable the closing ring to be adapted advantageously to the prevailing flows and the existing housing of the branch channel. At the same time, the use of two elements results advantageously in a reduction in the weight of the closing ring. A radially inner surface of a radially lower first element can serve for resting against an intermediate housing part. In a closed state of the closing device, a radially outer surface of the radially upper second element can be arranged in the radial direction at the same height as a following inner housing section of the branch channel and the second element can rest against the following inner housing section, in particular in a flush manner. The elements each have a surface that faces the flow, with the first, radially inner element forming a radially outer housing section of the primary flow channel in a closed state of the closing device and/or the second, radially outer element forming a radially inner housing section of the branch channel, in particular in an opened state of the closing device. The elements of the closing ring can be initially milled and then welded.

In a preferred further development, a first element of the closing ring is formed so as to be planar in the axial direction in order to make possible a sliding in the axial direction. This reduces the resistance and advantageously makes possible a uniform movement of the closing ring.

In an especially preferred further development, a second element of the closing ring is formed so as to be curved radially outward in the axial direction, in particular convexly, in order to advantageously enable a laminar flow over it in the axial direction in the branch channel. In the opened state of the closing device, the flow resistance can thereby be reduced advantageously.

In a further embodiment of the air conduction system, the two elements are joined to each other at a ring front edge, which, in particular, is a front edge of the closing ring in the axial direction. This makes possible advantageously a rigid and, at the same time, lightweight embodiment of the closing ring. Preferably, the elements form an angle, so that, advantageously, a flow can occur out of the primary flow channel via the closing ring into the branch channel in a low-loss manner at least in an opened state of the closing device. The angle can be at least 10° and at most 45°, in particular when the branch channel involves a secondary flow channel. The angle can preferably be greater than 30° and at most 90°, in particular when the branch channel involves a bleed air channel.

In a further embodiment of the air conduction system, the two elements can be joined through a reinforcement strut, in particular to form a hollow body. It is also possible to provide a plurality of struts distributed in the circumferential or peripheral direction. Owing to reinforcement struts, it is possible advantageously to increase further the rigidity of the closing ring without any great increase in weight. The reinforcement strut can be arranged in a rear region of the closing ring in the axial direction. Its greatest extension in a cross section in a meridional section can extend in the radial direction or can be at an angle to the radial direction.

Furthermore, in an embodiment of the air conduction system, the closing ring, in particular with the planar-formed first element, can slide over at least one radially inner sliding element fastened in the branch channel, with the sliding element being formed, in particular, as a sliding block made from a plastic, more preferably from a polyimide. This makes possible an especially low-friction movement of the closing ring. It can be provided that a plurality of sliding elements, distributed in the circumferential or peripheral direction and arranged in the radial direction within the first element, are fastened to the intermediate housing.

Beyond this, in the air conduction system, it can be provided that the closing device has an actuator, in particular exactly one actuator, for shifting the closing ring. In particular, owing to the high rigidity of the closing ring and the low weight of the closing ring because of the elements, an actuator can advantageously be formed to be relatively small, since the actuator needs to apply smaller forces in order to move the closing ring. The closing device can be placed by the actuator in an opened state, in a closed state, or in an intermediate position. In some embodiments of the air conduction systems, it can be provided that a plurality of actuators, distributed in the circumferential or peripheral direction, are provided.

In a preferred embodiment of the air conduction system, furthermore, it is provided that the closing ring can be shifted by the actuator in an axial direction and in a circumferential or peripheral direction. This can be achieved, in particular, by a rotational movement combined with a simultaneous axial displacement. Such kinematics make it possible especially to provide an actuator with a rotary drive, which routinely advantageously occupies a smaller space than, for example, a linear actuator.

In an especially preferred further development of the air conduction system, a drive of the actuator is arranged radially outside of the branch channel. This makes it possible advantageously and in a simple manner to keep small the inner installation space of the intermediate housing between the branch channel and the primary flow channel. The drive can be arranged in a cross section perpendicular to the axial direction particularly in a radially uppermost position. When the closing ring is closed, this makes it possible for the drive to advantageously need to work hardly at all against the force of the weight of the closing ring. The drive can be an electric motor or a hydraulic drive, in particular a hydraulic cylinder or hydraulic piston.

Beyond this, the actuator of the air conduction system can be further developed in such a way that a drive rod of the actuator is passed from radially outside of the branch channel through the branch channel and into the intermediate housing that radially separates the primary flow channel and the branch channel from each other and is connected pivotably through an adjusting lever of the actuator to the closing ring in order to shift the closing ring in the axial direction and in the circumferential or peripheral direction. The passing of the drive rod through the branch channel makes it possible advantageously to reduce the installation space in the engine itself and, particularly in the case of the secondary flow channel, to be able to arrange the latter close to the primary flow channel in order to rejoin the secondary flow with the primary flow in a simple way and/or to be able to cool efficiently the components of the aircraft engine that are arranged further downstream. The aircraft engine has to be correspondingly adapted. The drive rod can be formed in one piece and/or have a housing. The closing device can comprise an inner housing section and an outer housing section of the branch channel, with the inner and outer housing sections having openings for the rotary piston to pass through. The cross section of the drive rod and/or of its housing can be formed complementary to the cross sections of the openings of the housing sections. In a further advantageous development, the pivot axis of the adjusting lever on the closing ring can be arranged in the axial direction in front of a longitudinal axis of the drive rod, so that the applied rotational momentum due to the actuator is always sufficient and thus, advantageously, a closing movement can be executed in a stable manner.

In a further preferred further development of the air conduction system, at least one guide lever of the closing device is pivotably connected to the intermediate housing in order to stabilize a sliding movement of the closing ring. It is also possible to arrange a plurality of guide levers, distributed in the intermediate housing, in the circumferential or peripheral direction.

Finally, in a further aspect in accordance with the invention, an aircraft engine with a primary flow channel and a branch channel is proposed, wherein the branch channel branches off the primary flow channel at a connecting region, comprising one of the air conduction systems described above. In particular, the aircraft engine can be a low-bypass aircraft engine.

BRIEF DESCRIPTION OF THE DRAWING FIGURES

The invention will be explained in detail with respect to the following drawings on the basis of a preferred exemplary embodiment of the invention.

FIG. 4 shows the first exemplary embodiment of an air conduction system according to the invention in a front view.

DESCRIPTION OF THE INVENTION

Figure 1:
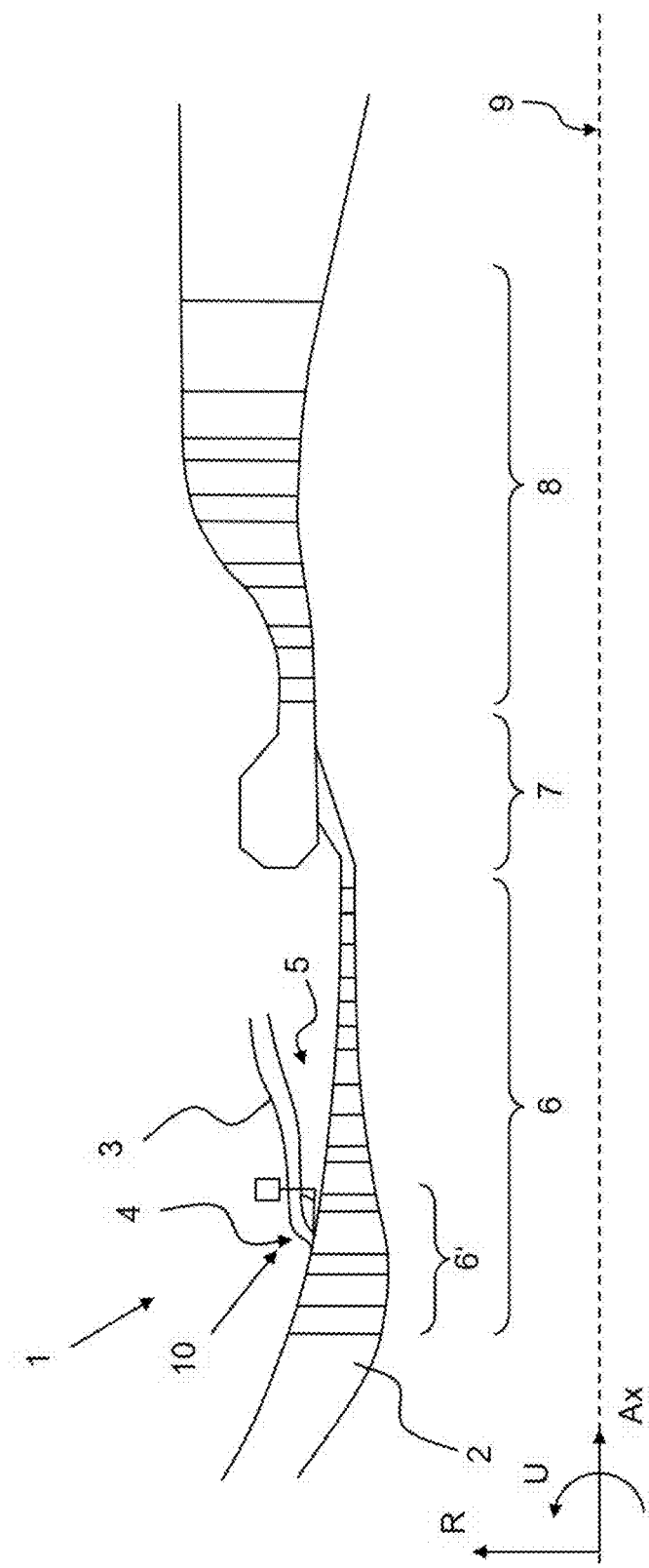
FIG. 1 shows an exemplary embodiment of an aircraft engine according to the invention with a first exemplary embodiment of an air conduction system according to the invention.

FIG. 1 shows a schematically depicted exemplary embodiment of an aircraft engine 1 in a meridional section with a primary flow channel 2 and a branch channel 3, with the branch channel 3 being formed as a secondary flow channel. The branch channel 3 branches off the primary flow channel 2 at a connecting region 4, with an intermediate housing 5 behind the connecting region 4 separating the two channels 2, 3 from each other in the radial direction. In the present exemplary embodiment, the branch channel 3 extends essentially parallel to the primary flow channel. Arranged in the primary flow channel 2 in the flow direction are a compressor 6 with a low-pressure compressor 6', a combustion chamber 7, and a turbine 8, with the connecting region 4 being arranged in the low-pressure compressor 6'. The aircraft engine 1 has an engine axis 9, on the basis of which an axial direction Ax that extends parallel to the engine axis 9, a radial direction R that extends perpendicular to the engine axis 9, and a circumferential or peripheral direction U of the engine 1 that extends around the engine axis are depicted.

Provided at the connecting region 4 is an air conduction system 10 according to the invention, which can separate the primary flow channel 2 from the branch flow channel 3.

Figure 2:
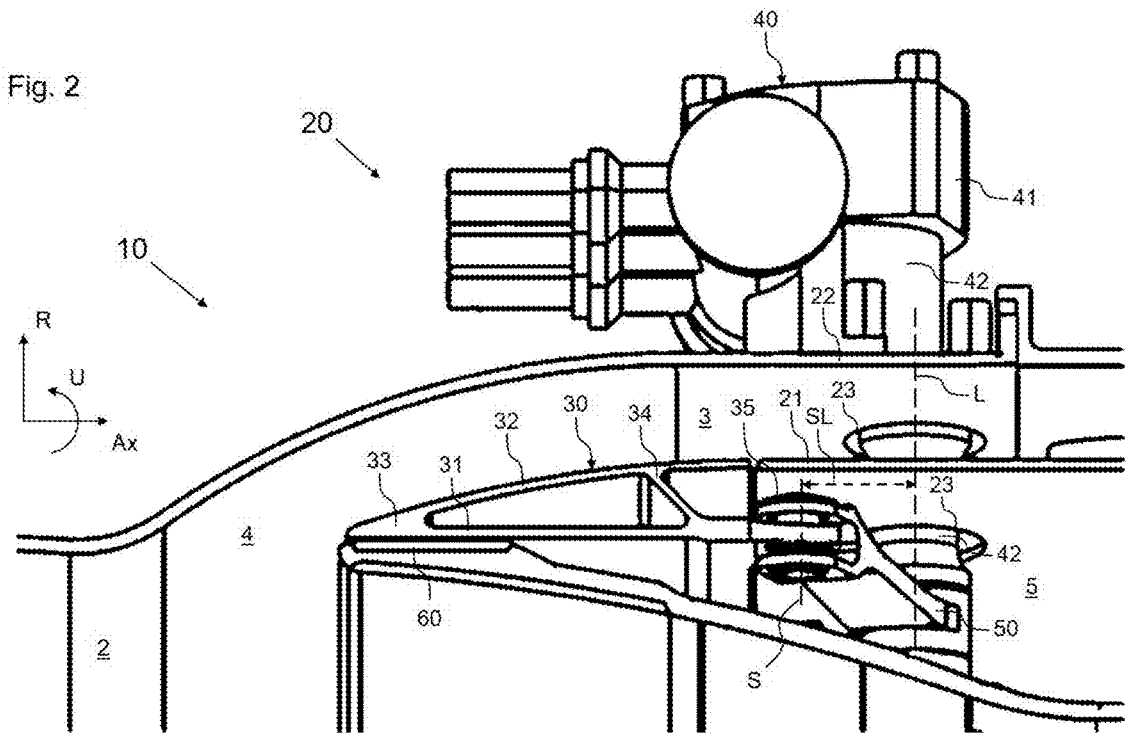
FIG. 2 shows the first exemplary embodiment of an air conduction system according to the invention in an opened state.
Figure 3:
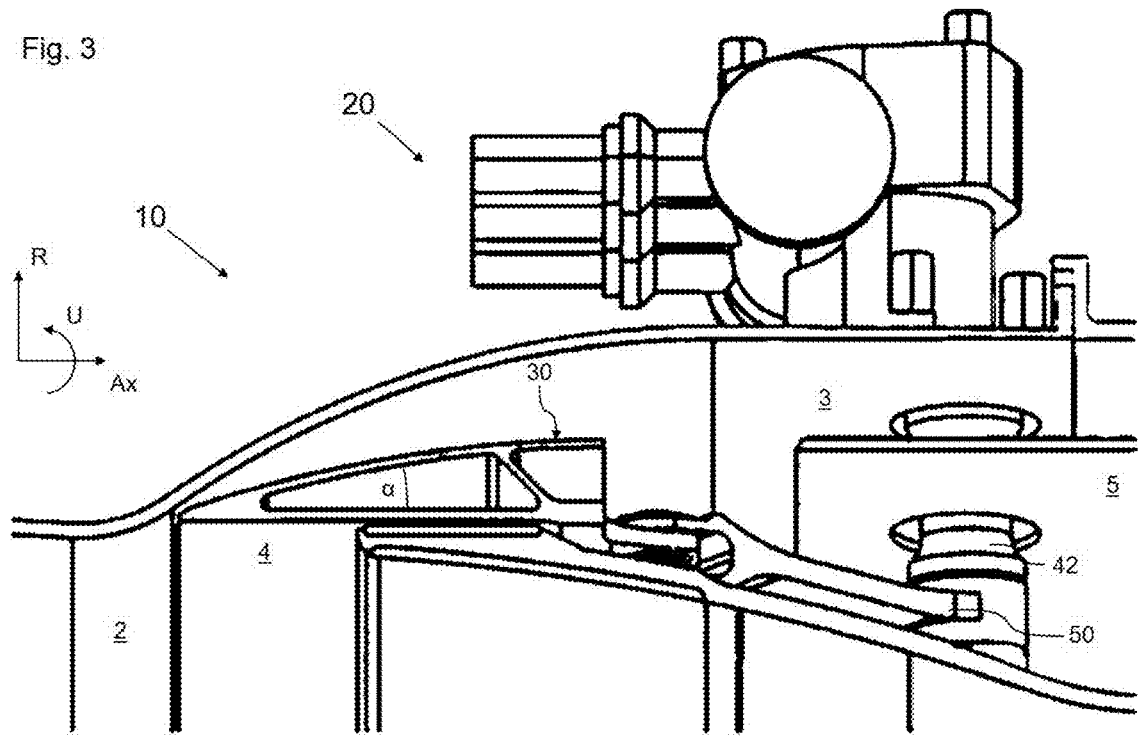
FIG. 3 shows the first exemplary embodiment of the air conduction system according to the invention in a closed state.

Described in detail in FIGS. 2 and 3 is the first exemplary embodiment of the air conduction system 10 according to the invention. The air conduction system 10 comprises a closing device 20 for separating the branch channel 3 from the primary flow channel 2. Shown in FIG. 2 is the closing device 20 in an opened state. In FIG. 3, the closing device 20 is shown in a closed state.

The closing device 20 here has a closing ring 30 that completely surrounds the primary flow channel 2 for closing the connecting region 4. Furthermore, the closing device 20 has exactly one actuator 40 for shifting the closing ring 30 radially outside of the branch channel 3. The closing ring 30 can be displaced by the actuator 40 in an axial direction Ax and rotated in a circumferential or peripheral direction U. In this way, the closing device 20 can be adjusted by the actuator 40 into the opened state, into the closed state, or into an intermediate position.

The closing ring 30 is formed from two elements 31, 32 that are joined to each other. The two elements 31, 32 are formed from sheet metal and are bent in the circumferential or peripheral direction U. The two elements each form a surface that faces the flow, with a first radially inner element 31 being formed to be planar and, during a displacement movement, to be slid over a plurality of sliding elements 60, each of which is formed as a sliding block made from polyimide. A second, radially outer element 32 which faces the flow in the branch channel 3 in the opened state of the closing device 20 shown in FIG. 2, is formed with a radially outward curvature, and guides the flow into the downstream branch channel 3. The downstream edge of the second element 32 here is at the same radial height as a housing section of the intermediate housing 5. The second element 32 lies against this housing section, so that the axial movement of the second element 32 is bounded by the housing section. Accordingly, in a simple way, a support surface is created advantageously. The two elements 31, 32 are joined to each other at a ring front edge 33, which is a front edge of the closing ring 30 in the axial direction Ax. They form an angle α of about 20°, so that a flow can occur from the primary flow channel 2 via the closing ring 30, at least in an opened state of the closing device 10, into the branch channel 3 in a laminar manner and accordingly in a low-loss manner Furthermore, in an axially rear region, the closing ring 30 comprises a stabilizing and strengthening reinforcement strut 34 between the two elements 31, 32, with the reinforcement strut 34, together with the two elements 31, 32, forming a hollow body. The closing ring is composed of a titanium alloy. For producing the closing ring 30, the elements 31, 32 of the closing ring 30 are initially milled and then welded.

The actuator 40 of the closing device 20 comprises a hydraulic drive 41 and a drive rod 42, which is formed in one piece and can be rotated around its longitudinal axis L by the drive 41, as well as an adjusting lever 50, which is fastened to the drive rod 42 and accordingly can also be pivoted around the longitudinal axis L of the drive rod 42. At one end of the adjusting lever 50 situated at the drive rod 42, the former is pivotably hinged at the closing ring 30 at a pivot joint 35. The pivot joint 35 comprises a pivot axis S, which, in the closed state of the closing device, is spaced apart by a distance SL from the longitudinal axis L of the drive rod 42. In this way, it is prevented advantageously that the closing ring 30 jams or that there is an insufficiently large torque for closing the closing ring 30 produced by the drive 41 of the actuator 40. The closing device 20 comprises an inner housing section 21 of the intermediate housing 5 and an outer housing section 22 of the branch channel 3, with the inner and outer housing sections 21, 22 having openings 23 for passing through the rotary piston. The cross sections of a non-depicted housing of the drive rod 42 are formed at the openings 23 so as to be complementary to the cross sections of the openings 23 of the housing sections 21, 22, so that as little air as possible can escape out of the branch channel.

In order to close the closing device 20 and to arrange the closing ring 30 in the connecting region 4 between the primary flow channel 2 and the branch channel 3, the actuator 40 can be operated. The drive 41 of the actuator 40 then rotates the drive rod 42 of the adjusting lever 50. The adjusting lever 50 displaces the closing ring 30 in the axial direction Ax and rotates the closing ring 30 in the circumferential or peripheral direction U.

In order to ensure that the closing ring 30 is guided uniformly in the circumferential or peripheral direction U, a plurality of guide levers 51—in the present exemplary embodiment, four guide levers—which are spaced uniformly apart from one another about the angle $\beta_{I-IV}$, are provided. In FIG. 4, the arrangement of the adjusting lever 50 and the guide lever 51 is depicted, by way of example, in a front view of the aircraft engine 1. In this case, the drive 41 can be arranged, in particular, in a radially uppermost position. The angles $\beta_{I-IV}$ can also be formed differently from one another.

What is claimed is:

1. An air conduction system for an aircraft engine having an engine axis with a primary flow channel and a branch channel, wherein the branch channel is a secondary flow channel and/or a bleed air channel and wherein the branch channel branches off the primary flow channel at a connecting region, comprising:
   a closing device arranged at or in the connecting region for separating the channel from the primary flow channel; the closing device having at least one closing ring for closing the connecting region and an actuator configured and arranged for displacing the closing ring;
   wherein the closing ring is displaced by the actuator in an axial direction and in a circumferential direction.

2. The air conduction system according to claim 1, wherein the closing ring is formed from at least two elements including a first element and a second element, which are joined to one another and are bent at least in the circumferential direction and are configured and arranged as sheet-metal-like annular elements.

3. The air conduction system according to claim 2, wherein the first element of the closing ring is formed to be flat in an axial direction to enable sliding thereof in the axial direction.

4. The air conduction system according to claim 3, wherein the first element, which is planar, is configured and arranged to glide over at least one radially inner sliding element fastened in the branch channel wherein the sliding element is a sliding block made of a polyimide.

5. The air conduction system according to claim 2, wherein the second element of the closing ring is configured and arranged to be curved radially outward relative to the engine axis.

6. The air conduction system according to claim 2, wherein the at least two elements are joined to each other at a ring front edge, which is a front edge of the closing ring in the axial direction and forms an angle.

7. The air conduction system according to claim 2, wherein the at least two elements are joined through a reinforcement strut to form a hollow body.

8. The air conduction system according to claim 1, wherein a drive of the actuator is arranged radially outside of the branch channel.

9. The air conduction system according to claim 1, wherein a drive rod of the actuator is passed from radially outside of the branch channel through the branch channel and into an intermediate housing, which radially separates the primary flow channel and the branch channel from each other, and is pivotably connected to the closing ring by way of an adjusting lever of the actuator to displace the closing ring in the axial direction and in the circumferential direction.

10. The air conduction system according to claim 9, wherein at least one guide lever of the closing device is pivotably connected to the intermediate housing to stabilize a sliding movement of the closing ring.

11. The aircraft engine with the primary flow channel and the branch channel, wherein the branch channel branches off the primary flow channel at the connecting region, comprising the air conduction system according to claim 1.

* * * * *